United States Patent [19]
Sugano

[11] 3,773,405
[45] Nov. 20, 1973

[54] DEVICE FOR DISPLACING PHOTOGRAPHIC LENS

[75] Inventor: Shigeaki Sugano, Tondabayashi, Japan

[73] Assignee: Minolta Camera Kabushiki Kaisha, Minamiku, Osaka, Japan

[22] Filed: May 10, 1972

[21] Appl. No.: 251,875

[52] U.S. Cl. ............................. 350/252, 350/255
[51] Int. Cl. ........................................ G02b 7/02
[58] Field of Search ..................... 350/245–257, 184

[56] References Cited
UNITED STATES PATENTS

| | | | |
|---|---|---|---|
| 2,526,433 | 10/1950 | Svensson | 350/255 |
| 3,663,093 | 5/1972 | Iida | 350/255 |
| 2,547,576 | 4/1951 | Guinchard | 350/255 |

Primary Examiner—David Schonberg
Assistant Examiner—Michael J. Tokar
Attorney—Stanley Wolder

[57] ABSTRACT

A displacing device comprises a photographic lens divided into a front lens group and a rear lens group with an air space interposed therebetween which is variable by the displacement of the two lens groups relative to each other, a focus ring displaceably engaged with an outer tube of the lens by a first method of displacement and integrally formed with a frame for holding one of the two lens groups, and an inner tube in engagement with means provided in the outer tube for regulating axial displacement and displaceably engaged with the focus ring by a second method of displacement, the inner tube being integrally formed with a frame for holding the other lens group.

4 Claims, 3 Drawing Figures

DEVICE FOR DISPLACING PHOTOGRAPHIC LENS

BACKGROUND OF THE INVENTION

The present invention relates to a device for displacing a photographic lens, more particularly to a device by which a photographic lens composed of a front lens group and a rear lens group is displaced as a whole for focusing through the movement of the front and rear lens groups relative to each other.

The photographic lens for a camera is generally so designed that the best correction of aberrations can be achieved at the infinity setting, and as the subject distance decreases the variation of aberrations increases to impair the characteristics of the image. Thus displacement of the lens causes a corresponding change in the characteristics of the image. Photographic lenses of the retrofocus type extensively used for photographic cameras, when displaced, are subject to especially marked variations in aberrations. Moreover, with the tendency in recent years to shorten the closest subject distance, it has become an important problem to remedy the deterioration of characteristics of image due to the variation of aberrations.

To overcome this problem, it is known to divide the photographic lens system into a front lens group and a rear lens group and to move the two groups relative to each other so as to render the air space for infinity setting different from that for close-up setting and thereby correct the variation of aberrations when close-ups are taken. Such arrangement assures good characteristics of image both for infinity setting and close-up setting.

A photographic lens system embodying the method described is shown in FIG. 1. A focus ring 3 is screwed in the front end of an outer tube 1 by means of a first set of helicoid screws 2, and an inner tube 5 having a rear lens group 4 constituting a photographic lens system along with another group is in screw-thread engagement with the focus ring 3 through a second set of helicoid screws 6. A frame 8 holding a front lens group 7 is screwed on the inner tube 5 by a third set of helicoid screws 9. The outer tube 1 and inner tube 5 are in engagement with each other by means of a keyway 10 and a key 11 for assuring an axial movement. The focus ring 3 and frame 8 for holding the front lens group are in engagement with each other through a keyway 14 and a key 13 extending through an opening 12 in the inner tube 5. Rotation of the focus ring 3 causes the focus ring 3 and front lens group holding frame 8 and inner tube 5 to move relative to each other in the axial driection thereof through the helicoid screws 2, 6 and 9 to vary an air space D between the front lens group 7 and the rear lens group 4. More specifically, the rotation of the focus ring 3 causes the inner tube 5 to be displaced axially and rotates the front lens group holding frame 8 for axial displacement.

The rotational angle of the focus ring 3 relative to the outer tube 1 is limitted by stoppers 15 and 16 to a focusing range. The outer tube 1 has a mount 17 for attaching an interchangeable lens to an unillustrated camera body and unillustrated diaphragm aperture ring and elements of automatic diaphragm means. The inner tube 5 is provided at its end with a mounting 18 for attachments such as a lens hood, filter and the like and has unillustrated elements of the automatic diaphragm means. The inner tube 5, being adapted for axial displacement, will not interfere with the automatic diaphragm means.

Thus, the conventional displacing device assuring improved characteristics of image as shown in FIG. 1 has two sets of helicoid screws or corresponding means for axially moving the diaphragm means suitably for automatic diaphragm aperture setting and a set of helicoid screws or corresponding means for displacing the lens system for correction. Briefly, the device includes three sets of helicoid screws or corresponding means.

To determine the relationship between the displacement of the front lens group and that of the rear lens group relative to each other in the construction described, it is assumed that the amount of displacement of the front lens group relative to the image plane is $A_1$, the amount of displacement of the rear lens group relative to the image plane is $A_2$, the leads of the respective first, second and third helicoid screws are $L_1$, $L_2$ and $L_3$ respectively, the lead of a right-handed helicoid screw is expressed in a positive numerical value and that of a left-handed helicoid screw in a negative value. The ratio $\rho$ between the amounts of displacement of the lens groups is as follows:

$$\rho = A_1/A_2 = (L_1 - L_2 + L_3)/(L_1 - L_2).$$

Further assuming that the variation of the air space between the front lens group and rear lens group is $\Delta D$ and the rotational angle of the focus ring is $\theta$, $$\Delta D = L_3 + \theta/360.$$

If for example $L_1 = 0.75$, $L_2 = -10.75$, $L_3 = -2.5$, $\theta = 91$;

$$\rho = (0.75 + 10.75 - 2.5)/(0.75 + 10.75) = 9/11.5 = 0.78.$$

$$\Delta D = -2.5 \times 91/360 = -0.63.$$

Thus, it is possible to correct changes in aberrations for close-up setting relative to infinity setting to obtain good characteristics of image both for infinite subject distance and close subject distance. Since the helicoid screws for displacing the lens groups have an important bearing on the performance of the lenses, characteristics of image and operativeness, machining of the screws have heretofore required use of high precision machine and a number of machining steps, hence costly. Accordingly, the construction described disadvantageously requires an additional set of helicoid screws plus two sets of helicoid screws employed in the conventional retrofocus photographic lens. Moreover, the use of three sets of helicoid screws renders the respective parts more complex in shape, increases the number of parts used, makes the photographic lens system much costly in its entirety and makes it difficult to provide a lightweight and compact interchangeable lenses.

SUMMARY OF THE INVENTION

An object of this invention is to enable only two sets of helicoid screws to move the front lens group and rear lens groups relative to each other and to move the lens groups for the correction of aberrations and to thereby provide a photographic lens in which the number of the helicoid screws has been reduced as compared with the improved conventional photographic lens described which requires three sets of helicoid screws and which assures the same characteristics of image as the photographic lens provided with three sets of helicoid screws.

According to the present invention, an outer tube having a bayonet mount or screw-thread mount for attachment to the camera body is fitted, by screw-thread engagement between a first set of helicoid screws, with a focus ring supported on the outer tube so as to be rotatable through a certain rotational angle. The focus ring is integrally formed with a frame for supporting either one of the front lens group and rear lens group and is fitted by screw-thread engagement between a second set of helicoid screws with an inner tube supporting the other lens group. The outer tube is engaged with the inner tube by means for regulating axial displacement comprising a known combination of a key and keyway.

Supposing that the lead of the helicoid screws on the outer tube side is $L_1$, the lead of the helicoid screws on the inner tube side is $L_2$ and the ratio between the amounts of displacement of the two lens groups relative to the image plane at the time of focusing is $\rho$, the two sets of the helicoid screws are so constructed as to fulfil the following condition:

$\rho$ = Amount of displacement of front lens group/Amount of displacement of rear lens group = $L_1/(L_1 - L_2)$ or $(L_1 - L_2)/L_1$.

Thus, the present invention has eliminated one set of helicoid screws from the conventional device to substantially reduce the number of machining steps, to simplify the shape of the constituent parts and to reduce the number of the parts used, making it possible to provide a lightweight, compact and excellent photographic lens having improved characteristics of image at close distance setting at nearly the same cost as the conventional photographic lens of the retrofocus type.

Other objects and features of this invention will become more apparent from the following detailed description of embodiments of the invention.

DESCRIPTION OF THE PREFERRED EMBODIMENTS

Figure 1:
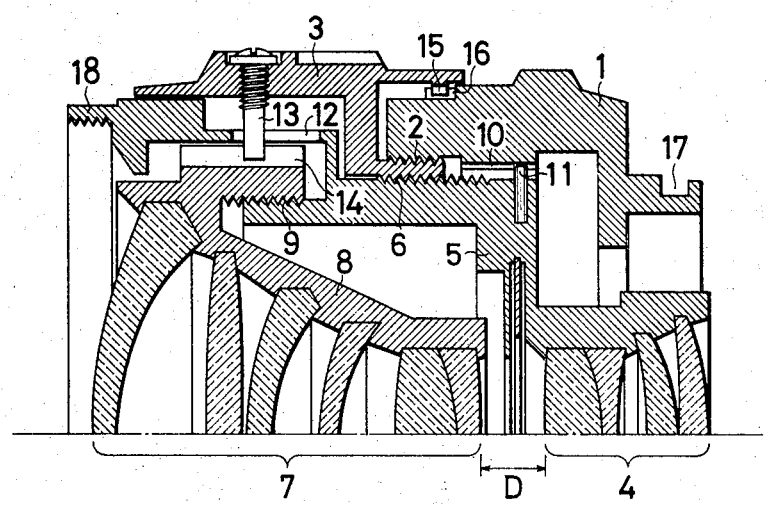
FIG. 1 is a view in vertical section showing a typical example of the conventional photographic lens provided with three sets of helicoid screws to assure improved characteristics of image at close-up subject distance, one half of the lens under the centerline being omitted.
Figure 2:
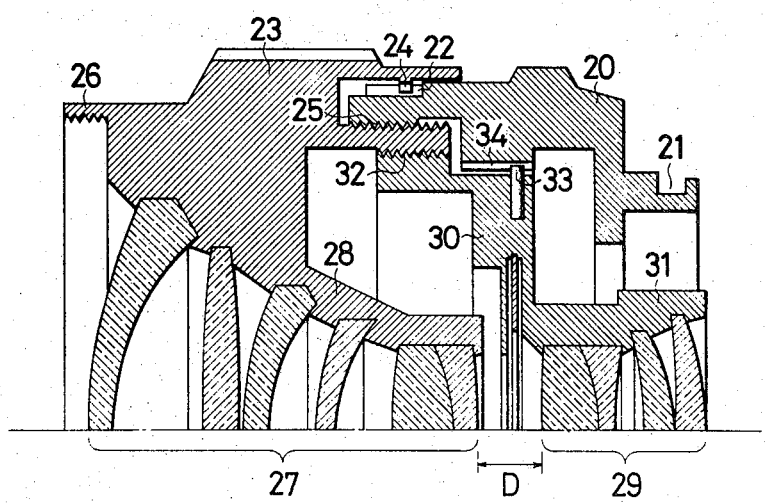
FIG. 2 is a view in vertical section showing the principal parts of embodiment of a photographic lens according to this invention, one half thereof under the centerline being omitted.

Referring to FIG. 2, an outer tube 20 has means such as bayonet mount 21, screw-thread mount, or the like for mounting an interchangeable lens on the camera body, unillustrated diaphragm aperture ring and elements for automatic diaphragm means and a stopper 22 which cooperates with a stopper pin 24 to limit the rotational angle of the focus ring 23. The outer tube 20 is in screw-thread engagement with the focus ring 23 by means of a first set of helicoid screws 25.

The focus ring 23 is formed at its front end with a portion 26 for mounting attachments such as a lens hood, filter, etc. and has integrally formed therewith an internal frame 28 for holding a front lens group 27 which constitutes a photographic lens system along with another group of lenses. The rotation of the focus ring 23 rotates the front lens group 27 for axial displacement.

A rear lens group 29 spaced apart from the front lens group 27 with a variable air space D disposed therebetween is supported on a lens holding frame 31 formed integrally with the inner tube 30 which is in screw-thread engagement with the focus ring 23 by means of a second set of helicoid screws 32. A key 33 extending from the inner tube 30 is slidably in engagement with a keyway 34 extending in the inner face of the outer tube 20 longitudinally thereof. The rotation of the focus ring 23 causes axial displacement of the rear lens group 29. The inner tube 30 is provided with unillustrated elements constituting the automatic diaphragm means.

In this way, the rotation of the focus ring 23 rotates the front lens group for axial displacement and effects axial displacement of the rear lens group. The relation between the displacement of the front lens group and that of the rear lens group as they are moved relative to each other is as follows:

$\rho = A_1/A_2 = L_1/(L_1 - L_2)$, $\Delta D = L_2 \times \theta/360$.

If, for example, $L_1 = 8$, $L_2 = -2.25$ and $\theta = 100°$, $\rho = 8/(8 + 2.25) = 0.78$, $\Delta D = 2.25 \times 100/360 = -0.63$.

Thus, the result is the same as that obtained when correction is made by displacing the lens groups utilizing three helicoid screws according to the prior art. Moreover this invention has eliminated one set of the screws from the conventional device.

Figure 3:
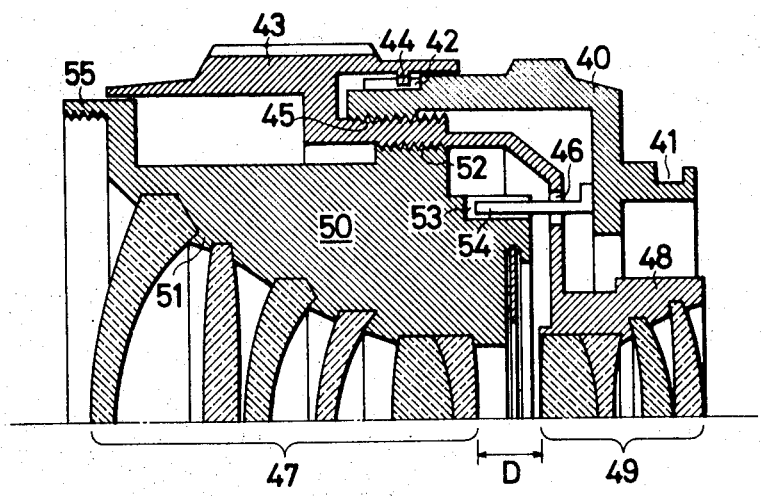
FIG. 3 is a view in vertical section showing the principal parts of another embodiment according to the invention, one half thereof under the centerline being omitted as in FIG. 2.

Referring to FIG. 3 showing another embodiment of this invention, an outer tube 40 has means such as a bayonet mount 41 for mounting an interchangeable lens as in the case of FIG. 2, unillustrated diaphragm aperture ring and elements constituting an automatic diaphragm means and a stopper 42 which cooperates with a stopper pin 44 of a focus ring 43 to limit the rotational angle of a focus ring 43. The outer tube 40 is in screw-thread engagement with a focus ring 43 through a first set of helicoid screws 45.

The focus ring 43 is integrally formed with a frame 48 for holding a rear lens group 49 constituting a photographic lens system along with a front lens group 47.

The front lens group 47 is held by a frame 51 formed integrally with an inner tube 50 which is in engagement with the focus ring 43 through a second set of helicoid screws 52 and which is formed with a keyway 53. A key 54 extends from the outer tube 40 through a window 46 formed in the focus ring 43 and extending circumferentially thereof. The distal end of the key 54 positioned inside the focus ring 43 engages in the keyway 53. The rotation of the focus ring 43 displaces the front lens group 47 in the axial direction. The inner tube 50 is further formed with a portion 55 for mounting attachments such as a lens hood, etc., and unillustrated elements constituting the automatic diaphragm means. The focus ring 43 is formed with a window (not shown) or the like for an interlocking member for operatively associating the elements of the automatic diaphragm means on the inner tube with those on the outer tube and on the camera body.

According to the embodiment shown in FIG. 3, the holding member for the front lens group and the holding member for the rear lens group in FIG. 2 are replaced with each other. In the case of FIG. 3, the front lens group 47 is displaced in the axial direction and the rear lens group 49 is rotated for axial displacement. The relation in the displacement between the two lens groups is as follows:

$\rho = A_1/A_2 = (L_1 - L_2)/L_1,$
$\Delta D = -L_2 \times \theta/360.$
If $L_1 = 10.25, L_2 = 2.25$ and $\theta = 100°,$
$\rho = (10.25 - 2.25)/10.25 = 0.78,$
$\Delta D = -2.25 \times 100/360 = -0.63.$ The result is therefore identical with that in FIG. 2.

Although the illustrated embodiments have a front lens group including six lenses and a rear lens group composed of four lenses, the front lens group may be composed of three lenses, with the rear lens group including seven lenses. Alternatively, the front lens system may be composed of eight lenses and the rear lens group may be made up of two lenses. Further depending upon the design of the lens system, the total number of the constituent lenses need not be limited to ten but the number of the lenses constituting the lens groups is variable as desired.

Further the means for effecting displacement need not be limited to the helicoid screw, but it is possible to use a cam groove or the like in place the helicoid screw within the scope of this invention. In addition to the helicoid screws used for fitting together the outer tube, inner tube and focus ring, these members may be provided with tubular fitting faces to render them slidable so as to facilitate alignment of the optical axes of the lens groups. The present invention is applicable not only to interchangeable lenses for single-lens reflex camera but also to other photographic lenses.

What is claimed is:

1. A photographic lens for a camera comprising:
a photographic lens system divided into a front lens group and a rear lens group with an air space variable by displacement formed therebetween, an outer tube for mounting the photographic lens on the camera body, a focus ring engaged with the outer tube by first displacing means for axially adjusting said focus ring relative to said outer tube by rotation of said focus ring within a focusing range, the focus ring being integrally formed with a frame for holding one of the two lens groups, and an inner tube in engagement with means for regulating axial displacement provided on the outer tube and displaceably engaged with the focus ring by second displacing means, the inner tube being integrally formed with a frame for holding the other lens group of the photographic lens system and adapted for axial displacement relative to said focus ring by the rotation of the focus ring.

2. The photographic lens as set forth in claim 1 wherein the displacing means are helicoid screws, the outer tube being in screw-thread engagement with the focus ring by first helicoid screw, the focus ring being in screw-thread engagement with the inner tube by second helicoid screws.

3. The photographic lens as set forth in claim 1 wherein the focus ring holds in its lens holding frame the front lens group of the photographic lens system divided into the front and rear lens groups and the inner tube holds the rear lens group in its lens holding frame.

4. The photographic lens as set forth in claim 1 wherein the focus ring holds in its lens holding frame the rear lens group of the photographic lens system divided into the front and rear lens groups and the inner tube holds the front lens group in its lens holding frame.

* * * * *

UNITED STATES PATENT OFFICE
CERTIFICATE OF CORRECTION

Patent No. 3,773,405            Dated November 20, 1973

Inventor(s) SHIGEAKI SUGANO

It is certified that error appears in the above-identified patent and that said Letters Patent are hereby corrected as shown below:

-- 30 Foreign Application Priority Data

June 9, 1971...............46-48539 --

Signed and sealed this 9th day of April 1974.

(SEAL)
Attest:

EDWARD M. FLETCHER, JR.        C. MARSHALL DANN
Attesting Officer                Commissioner of Patents